(12) United States Patent
Duesing et al.

(10) Patent No.: US 9,568,198 B2
(45) Date of Patent: Feb. 14, 2017

(54) COMBUSTION DEVICE HAVING A DISTRIBUTION PLENUM

(71) Applicant: ALSTOM Technology Ltd, Baden (CH)

(72) Inventors: Michael Duesing, Rheinfelden (DE); Andrea Ciani, Zurich (CH); Adnan Eroglu, Untersiggenthal (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/491,082

(22) Filed: Sep. 19, 2014

(65) Prior Publication Data

US 2015/0007547 A1 Jan. 8, 2015

Related U.S. Application Data

(63) Continuation of application No. PCT/EP2013/055940, filed on Mar. 21, 2013.

(30) Foreign Application Priority Data

Mar. 23, 2012 (EP) .................................... 12161079

(51) Int. Cl.
| | |
|---|---|
| *F23R 3/34* | (2006.01) |
| *F23R 3/18* | (2006.01) |
| *F23R 3/28* | (2006.01) |
| *F23C 3/00* | (2006.01) |
| *F02C 6/00* | (2006.01) |
| *F02C 7/228* | (2006.01) |

(52) U.S. Cl.
CPC ................. *F23R 3/34* (2013.01); *F02C 6/003* (2013.01); *F02C 7/228* (2013.01); *F23C 3/002* (2013.01); *F23R 3/18* (2013.01); *F23R 3/28* (2013.01); *F23R 2900/03341* (2013.01)

(58) Field of Classification Search
CPC ............... F23C 3/002; F23R 3/18; F23R 3/28; F23R 3/34; F23R 2900/03341; F02C 7/228; F02C 6/003
See application file for complete search history.

(56) References Cited

U.S. PATENT DOCUMENTS

| | | | | |
|---|---|---|---|---|
| 4,642,993 A | * | 2/1987 | Sweet ..................... | F23R 3/002 428/116 |
| 5,609,030 A | * | 3/1997 | Althaus ................... | F23D 23/00 60/737 |
| 5,626,017 A | * | 5/1997 | Sattelmayer ............ | F23C 6/042 60/723 |
| 6,047,550 A | * | 4/2000 | Beebe ...................... | F23L 7/00 60/733 |

(Continued)

FOREIGN PATENT DOCUMENTS

| | | |
|---|---|---|
| CN | 102087026 A | 6/2011 |
| EP | 0 611 879 A1 | 8/1994 |

(Continued)

*Primary Examiner* — Carlos A Rivera
(74) *Attorney, Agent, or Firm* — Buchanan Ingersoll & Rooney PC

(57) ABSTRACT

The combustion device includes a burner, a combustion chamber downstream of the burner, a lance projecting into the burner for fuel and air injection, and a plenum that at least partly houses the burner. The plenum is connected to the inside of the lance to supply an oxidiser to it.

15 Claims, 3 Drawing Sheets

(56) References Cited

U.S. PATENT DOCUMENTS

| | | | | |
|---|---|---|---|---|
| 6,311,471 B1* | 11/2001 | Waldherr | ............... | F02C 3/30 60/39.55 |
| 6,688,111 B2* | 2/2004 | Stalder | ............... | F23D 11/402 60/737 |
| 6,691,503 B2* | 2/2004 | Tiemann | ............... | F02C 6/003 60/39.15 |
| 7,568,335 B2* | 8/2009 | Althaus | ............... | F02C 6/003 60/39.17 |
| 8,783,008 B2* | 7/2014 | Eroglu | ............... | F23R 3/286 60/39.17 |
| 2005/0229581 A1* | 10/2005 | Bellucci | ............... | F23D 11/402 60/39.17 |
| 2006/0272331 A1* | 12/2006 | Bucker | ............... | C01B 3/386 60/774 |
| 2010/0192591 A1* | 8/2010 | Eroglu | ............... | F23R 3/34 60/772 |
| 2010/0236246 A1* | 9/2010 | Buss | ............... | F23D 11/402 60/740 |
| 2010/0300109 A1* | 12/2010 | Carroni | ............... | F23R 3/286 60/776 |
| 2011/0314825 A1* | 12/2011 | Stryapunin | ............... | F02C 7/22 60/737 |
| 2012/0260665 A1* | 10/2012 | Eroglu | ............... | F23R 3/286 60/774 |

FOREIGN PATENT DOCUMENTS

| | | |
|---|---|---|
| EP | 0 694 740 A2 | 1/1996 |
| EP | 0 718 558 A2 | 6/1996 |
| EP | 2 072 899 A1 | 6/2009 |
| EP | 2 116 769 A1 | 11/2009 |
| EP | 2 211 110 A1 | 7/2010 |
| WO | 2009/109454 A1 | 9/2009 |

* cited by examiner

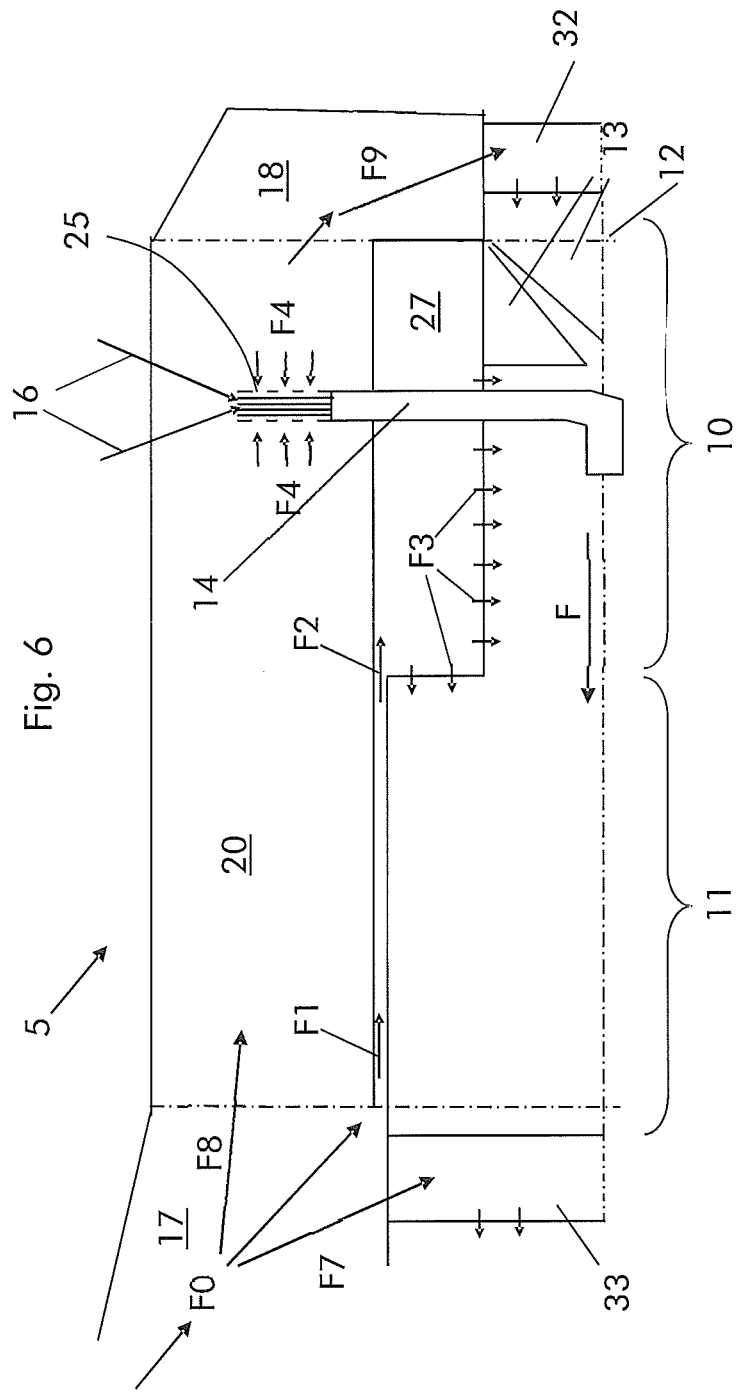

COMBUSTION DEVICE HAVING A DISTRIBUTION PLENUM

CROSS-REFERENCE TO RELATED APPLICATIONS

This application claims priority to PCT/EP2013/055940 filed Mar. 21, 2013, which claims priority to European application 12161079.4 filed Mar. 23, 2012, both of which are hereby incorporated in their entireties.

TECHNICAL FIELD

The present disclosure relates to a combustion device. In particular in the following reference to a gas turbine is made, for example a sequential combustion gas turbine, it is anyhow clear that the same device can be implemented also in different applications such as furnaces.

BACKGROUND

With reference to FIG. 1, gas turbines 1 have a compressor 2, a combustion device 3 and a turbine 4; the compressor 2 generates high pressure air that is supplied together with a fuel to the combustion device 3 where they are combusted to generate hot gases that are expanded in the turbine 4 (high pressure turbine); from the turbine 4 exhaust gases are discharged.

Sequential combustion gas turbines have a second combustion device 5 downstream of the high pressure turbine 4 where additional fuel is supplied into the exhaust gases and it is combusted to generate hot gases that are then expanded in a second turbine 6 (low pressure turbine).

Within the second combustion device 5, together with fuel, also air is injected; this air has mainly the functions of helping fuel penetration into the exhaust gases flowing through the second combustion device, and preventing an early fuel combustion immediately after injection.

Since the exhaust gases that pass through the second combustion device 5 have a large pressure (because only partial expansion occurs in the high pressure turbine 4), the air that is injected into the second combustion device 5 is drawn from the last stage of the compressor 2.

This cooling scheme has some drawbacks.

In fact, since at the last stage of the compressor 2 the air has a large pressure, drawing air (and thus preventing this air from combustion and expansion) has a large negative impact on the performances and efficiency of the gas turbine.

SUMMARY

An aspect of the disclosure includes providing a combustion device with improved performances and efficiency when compared to known combustion devices.

Another aspect of the disclosure is to provide a combustion device in which the negative impact of air drawing from the compressor can be reduced.

These and further aspects are attained by providing a combustion device in accordance with the accompanying claims.

Advantageously, flashback margin is increased and NOx emissions are reduced.

BRIEF DESCRIPTION OF THE DRAWINGS

Further characteristics and advantages will be more apparent from the description of a preferred but non-exclusive embodiment of the combustion device, illustrated by way of non-limiting example in the accompanying drawings, in which:

FIG. 6 shows a further embodiment with cooling air distribution.

DETAILED DESCRIPTION

Figure 1:
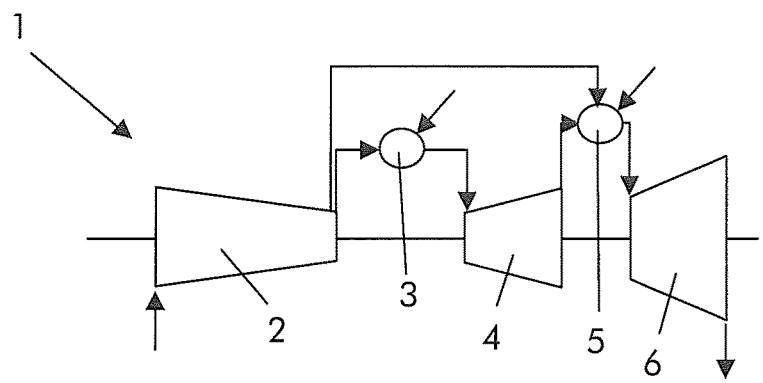
FIG. 1 is a schematic view of a known gas turbine.
Figure 2:
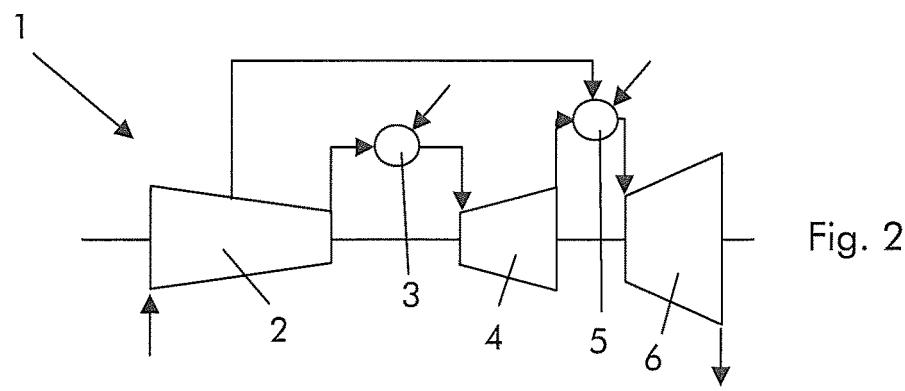
FIG. 2 is a schematic view of a gas turbine in an embodiment of the invention.

In the following reference to the attached drawings is made; the drawings include the same reference numbers for the same or similar parts throughout the several views.

The combustion device is preferably a part of a gas turbine, for example a sequential combustion gas turbine 1.

The sequential combustion gas turbine 1 includes a compressor 2, a first combustion device 3, a first turbine 4 (high pressure turbine), a second combustion device 5 and a second turbine 6 (low pressure turbine). These gas turbines are well known in the art.

During operation the compressor 2 compresses an oxidiser and supplies it to the first combustion device 3. The oxidiser is usually air and in the following reference to air is made. The first combustion device 3 receives the compressed air and a fuel and combusts them generating hot gases that are partly expanded in the first turbine 4. The exhaust gases from the first turbine 4 enter the second combustion device 5 wherein additional fuel is supplied and combusted generating hot gases that are then expanded in the second turbine 6.

The second combustion device 5 comprises a burner 10; during operation a flow F (exhaust gases from the turbine 4) flows through the burner 10. Naturally in different kinds of burners or gas turbines or applications of the combustion device the flow can be a different flow from the exhaust gases.

Downstream of the burner 10 a combustion chamber 11 is provided.

The burner has an inlet 12 with vortex generators 13 (for example tetrahedral vortex generators) and a lance 14 projecting into the burner 2 for fuel and air injection.

Air injected through the lance 14 is mainly used for:
helping fuel penetration into the exhaust gases flowing through the burner 10,
shielding and protecting the fuel after injection, to prevent its immediate combustion after injection,
cooling of the lance while flowing through it.

The lance 14 is connected to an air source and a fuel tank (reference 16 indicates pipes from fuel tanks).

In different examples the lance 14 can be arranged to supply different fuels, for example a liquid fuel such as oil and a gaseous fuel; in this case the lance 14 is connected to two or more fuel tanks, each for a kind of fuel.

The combustion device 5 has a plenum that houses the burner 10 and the combustion chamber 11; within the plenum the air is substantially still (i.e. motionless).

The plenum is connected to the inside of the lance 14 to supply air to it.

The plenum can include an outer plenum 20 and an inner plenum 27; the outer plenum 20 houses the inner plenum 27 that is connected to the burner 10 for supplying air to it. The inner plenum 27 and the outer plenum 20 are connected by a cooling path for the combustion chamber 11.

The lance 14 comprises a duct 21 for air and one or more ducts for fuel 23, 24 (for example the lance 14 can supply two different fuels, in this case each duct 23, 24 is connected to a fuel tank). The plenum 20 or 27 is connected to the duct 21 for air.

Preferably, the duct 21 for air encircles the ducts for fuel 23, 24 and the lance 14 has a portion housed in the plenum 20, 27. In addition, the duct 21 for air has one or more openings 25 connecting it to the plenum 20 or 27.

Figure 3:
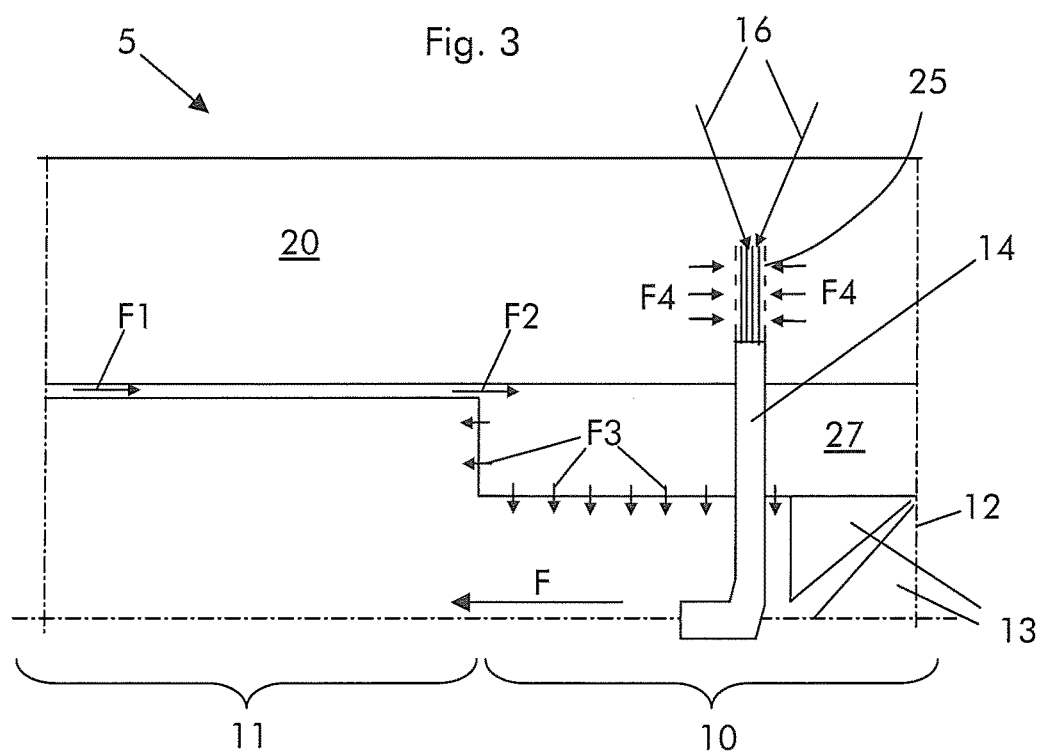
FIGS. 3 and 4 show a particular of the gas turbine in different embodiments of the invention.

In particular, FIG. 3 shows an example in which the duct 21 for air is connected to the outer plenum 20.

Figure 4:
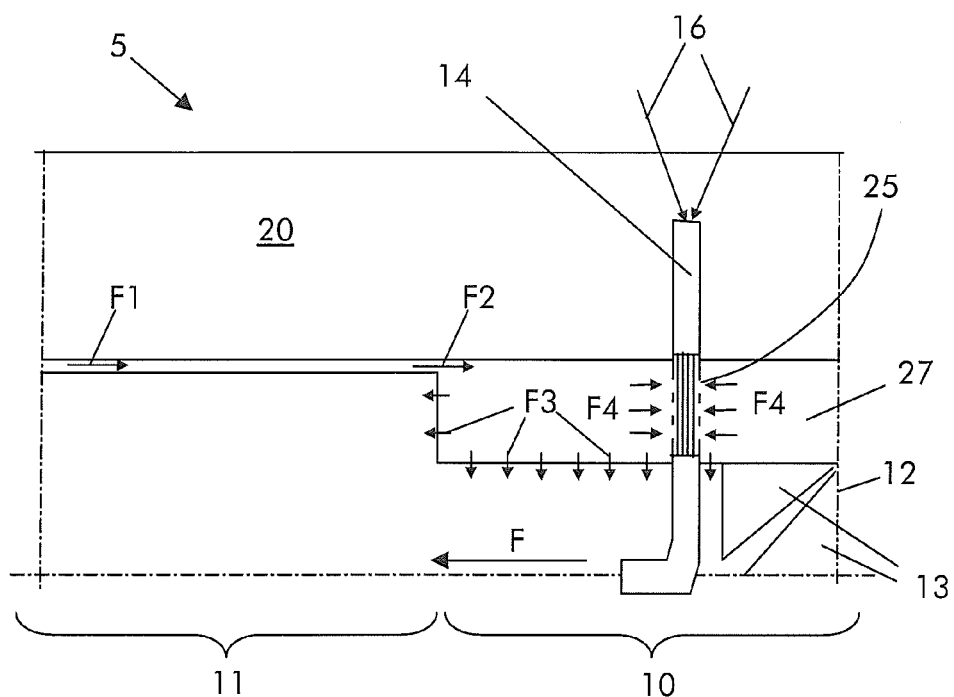
Figure 5:
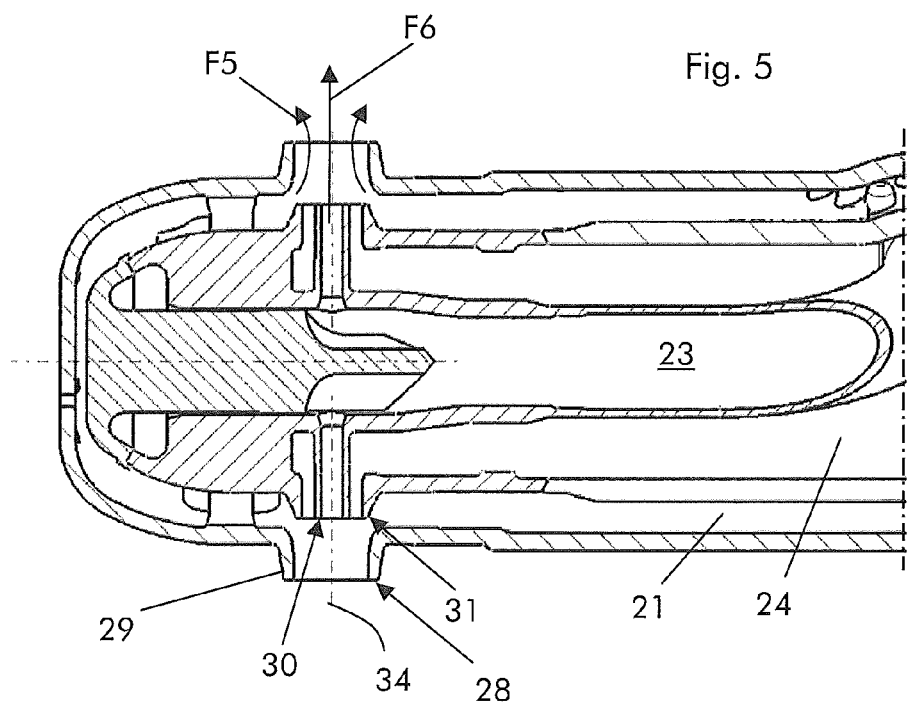
FIG. 5 is a particular of a lance.

FIG. 4 shows an example in which the duct 21 for air is connected to the inner plenum 27.

Preferably the air pressure losses at the inlet of the duct 21 are minimised by proper shaping of that inlet geometry.

The embodiment of FIG. 4 (i.e. the embodiment with the duct 21 connected to the inner plenum 27) lets air with a lower pressure be supplied through the lance 14 and duct (because air undergoes pressure drops to reach the inner plenum 27).

The connection of the duct 21 to the inner or outer plenum 27, 20 lets the air injected into the burner 10 have a pressure close to the pressure of the flow (exhaust gases) flowing through it.

The duct 21 for air has nozzles 28 with sleeves 29 protruding outwardly from the duct 21 for air. This feature is not mandatory, but can help air and fuel penetration. Preferably in the embodiment of FIG. 4 the sleeves are longer than the sleeves of the embodiment of FIG. 3; the longer length helps penetration into the hot gases when the air pressure is lower.

As shown, the nozzles for the duct 21 for air are substantially coaxial (reference 34 indicates the axis of the nozzles 29, 30, 31) with the nozzles 30, 31 of the ducts 23, 24 for fuel.

The ducts 23, 24 for fuel have nozzles 30, 31 with sleeves protruding outwardly from the respective duct 23, 24 for fuel.

The operation of the combustion device is apparent from that described and illustrated and is substantially the following (with reference to FIG. 3).

Air is drawn from the compressor 2 at an intermediate part thereof, where the air pressure is close to the pressure of the exhaust gases F. This air is supplied into the outer plenum 20.

From the outer plenum 20 air enters the duct 21 via the openings 25 (arrows F4), passes through the duct 21 of the lance 14, reaches the nozzles 28 and is injected (arrows F5) through the nozzles 28 together with a fuel (arrow F6).

In the embodiment of FIG. 4 air is used to cool the combustion chamber walls (arrows F1) and it is then supplied into the inner plenum 27 (arrow F2). From the inner plenum 27 cooling air is supplied through the walls of the burner to cool them (arrow F3). In addition, air enters the duct 21 of the lance 14 through the openings 25 (arrows F4) and passes through the duct 21, reaching the nozzles 28. Then the air is injected into the burner 10 (arrow F5) through the nozzles 28 together with a fuel (arrows F6).

Surprisingly, it was ascertained that also when the air injected through the lance 14 has a pressure close to the given flow pressure, operation still occurs correctly in terms of fuel penetration and combustion.

Naturally the features described may be independently provided from one another.

In practice the materials used and the dimensions can be chosen at will according to requirements and to the state of the art.

The embodiment of FIG. 6 is based on the embodiment of FIG. 3. In addition to the details shown in FIG. 3 the air supply to the plenum 20 and inner plenum 27 are shown. Further, the first turbine vane row 33 downstream of the combustion chamber 11 and outlet guide vanes upstream of the burner 10 as well as an outlet plenum 18 are shown.

The air supply to the plenum 20 and the inner plenum 27 is provided by a main distribution plenum 17. In this example the cooling air F7 required for cooling the first turbine vane row 33 is also provided by the main distribution plenum 17. A cooling air flow F0 is provided to the main distribution plenum 17. Typically cooling air flow F0 is medium pressure cooling air which can be taken from a compressor bleed (i.e. before the compressor exit). According to one embodiment the cooling air flow F8 for the plenum 20 and the cooling air flow F1 for the inner plenum 27 are provided by the main distribution plenum 17.

The plena 17, 18, 20, and 27 can be annular plena concentrically surrounding the hot gas path of the gas turbine. The inlet plenum 18 can be arranged concentrically around the inlet guide vane row 32. The main distribution plenum 17 can be arranged concentrically around the first turbine vane row 33. The plenum 20 can be arranged concentrically around the combustion chamber 11 and the inner plenum 27.

In the embodiment shown in FIG. 6 also the cooling air flow F7 for the first turbine vane row 33 is provided by the main distribution plenum 17.

In the embodiment shown in FIG. 6 also the cooling air flow F9 for the inlet guide vane row 32 is provided by the main distribution plenum 17. In this case an additional outlet plenum 18 is arranged at the upstream end of the burner 27 for the cooling air supply of the inlet guide vane row 32. The cooling air flow F9 for the inlet guide vane row 32 is provided from the main distribution plenum F0 via the plenum 20.

The use of one main distribution plenum 17 reduces the need for cooling air supply lines and allows the use of medium pressure cooling air for the whole combustion chamber 11, and burner 10.

Depending on the embodiment also the cooling air of the first vane row 33 and the inlet guide vane 32 can be provided from the main distribution air plenum.

The flow velocities in the plena 17, 18 and 20 are small compared to the flow velocities of cooling air along the liner (flow F1) of the combustion chamber and in the vanes 32, 33. In particular cross section of the plenum 20 is kept large to reduce the flow velocity in the plenum 20 in order to keep the pressure drop across the plenum 20 small. According to one embodiment the flow velocity can be kept below 30 m/s. According to a further embodiment the flow velocity can be kept below 15 m/s.

In contrast the flow velocity of the air flow F1 along the liner of the combustion chamber 11 can be higher than 30 m/s or even higher than 50 m/s.

As a result, even so the air flow F1 and the air flow F8 are feed from the same main distribution plenum the pressure for feeding the air flow 4 to the lance 14 is higher than the pressure in the inner plenum 27.

Due to the low pressure drop in the plenum 20 and the inlet plenum 18 the pressure in the inlet plenum 18 is sufficient that cooling air to the outlet guide vanes 32 can be supplied.

The invention claimed is:

1. A combustion device comprising:
   a burner,
   a combustion chamber downstream of the burner, a lance projecting into the burner for fuel and air injection, and a main distribution plenum, an inner plenum, and an outer plenum that houses the inner plenum and the burner, the inner plenum connected to the burner to supply air to the burner, the outer plenum connected to the lance to supply air to the lance, the main distribution plenum configured to supply air received from a compressor bleed to the outer plenum at a first flow rate, the inner plenum at a second flow rate that is greater than the first flow rate, a first row of turbine vanes downstream of the combustion chamber and an outlet plenum configured to supply air received from the main distribution plenum to outlet guide vanes upstream of the burner;

wherein the main distribution plenum, inner plenum and outer plenum are configured such that a pressure at which air is fed to the lance is higher than a pressure within the inner plenum.

2. The combustion device according to claim 1, wherein the lance comprises an air duct for the air received from the outer plenum, the lance also comprising at least one fuel duct.

3. The combustion device according to claim 2, wherein the air duct encircles the at least one fuel duct.

4. The combustion device according to claim 2, wherein the lance has a portion housed in the inner plenum.

5. The combustion device according to claim 4, wherein the outer plenum is connected to the inner plenum by a cooling path for the combustion chamber.

6. The combustion device according to claim 2, wherein the air duct is connected to the outer plenum.

7. The combustion device according to claim 2, wherein the air duct includes nozzles with sleeves protruding outwardly from the air duct.

8. The combustion device according to claim 7, wherein the at least one fuel duct includes nozzles, the nozzles for the air duct being substantially coaxial with the nozzles of the at least one fuel duct.

9. The combustion device according to claim 8, wherein the nozzles of the at least one fuel duct include sleeves protruding outwardly from the at least one fuel duct.

10. The combustion device of claim 1, wherein the main distribution plenum, the outer plenum, the inner plenum, and the outlet plenum are arranged concentrically surrounding a gas path of the gas turbine.

11. The combustion device of claim 1, wherein the main distribution plenum is arranged concentrically around the first row of turbine vanes, the outer plenum is arranged concentrically around the combustion chamber and the inner plenum, and the outlet plenum is arranged concentrically around the outlet guide vanes.

12. The combustion device of claim 1, wherein the main distribution plenum receives air such that a flow velocity of air passing through the outer plenum is kept below 30 m/s.

13. The combustion chamber of claim 12, wherein the combustion chamber is configured such that a cooling air flow of the air supplied from the main distribution plenum to the inner plenum is passed along a liner of the combustion chamber at a speed of greater than 50 m/s.

14. The combustion device of claim 1, wherein the main distribution plenum receives air such that a flow velocity of air passing through the outer plenum is kept below 15 m/s.

15. The combustion chamber of claim 14, wherein the combustion chamber is configured such that a cooling air flow of the air supplied from the main distribution plenum to the inner plenum is passed along a liner of the combustion chamber at a speed of greater than 30 m/s.

* * * * *